US011436029B2

(12) United States Patent
Hanafusa et al.

(10) Patent No.: US 11,436,029 B2
(45) Date of Patent: Sep. 6, 2022

(54) HELP INFORMATION DISPLAY SYSTEM, HELP INFORMATION DISPLAY METHOD, AND HELP INFORMATION DISPLAY PROGRAM

(71) Applicant: Broadleaf Co., Ltd., Tokyo (JP)

(72) Inventors: Shinsuke Hanafusa, Tokyo (JP); Ryota Sokei, Tokyo (JP); Yuichiro Nanbu, Tokyo (JP); Seiichiro Nitta, Tokyo (JP)

(73) Assignee: Broadleaf Co., Ltd., Tokyo (JP)

( * ) Notice: Subject to any disclaimer, the term of this patent is extended or adjusted under 35 U.S.C. 154(b) by 0 days.

(21) Appl. No.: 17/280,033

(22) PCT Filed: Sep. 27, 2019

(86) PCT No.: PCT/JP2019/038403
§ 371 (c)(1),
(2) Date: Mar. 25, 2021

(87) PCT Pub. No.: WO2020/067531
PCT Pub. Date: Apr. 2, 2020

(65) Prior Publication Data
US 2022/0058040 A1     Feb. 24, 2022

(30) Foreign Application Priority Data
Sep. 28, 2018  (JP) .............................. JP2018-184359

(51) Int. Cl.
*G06F 3/0482*       (2013.01)
*G06F 9/451*        (2018.01)
(Continued)

(52) U.S. Cl.
CPC ............ *G06F 9/453* (2018.02); *G06F 3/0482* (2013.01); *G06F 3/04842* (2013.01); *G06F 11/3438* (2013.01); *G06F 11/3476* (2013.01)

(58) Field of Classification Search
CPC .............. G06F 3/0482; G06F 3/04842; G06F 11/3438; G06F 11/3476
See application file for complete search history.

(56) References Cited

U.S. PATENT DOCUMENTS

| | | | |
|---|---|---|---|
| 2006/0036991 A1* | 2/2006 | Biazetti | G06F 9/453 717/104 |
| 2008/0229196 A1* | 9/2008 | Yamagata | G06F 9/453 715/705 |
| 2018/0316801 A1* | 11/2018 | Oikawa | H04N 1/00076 |

FOREIGN PATENT DOCUMENTS

| | | |
|---|---|---|
| JP | 2008-226183 A | 9/2008 |
| JP | 2009-282817 A | 12/2009 |

(Continued)

OTHER PUBLICATIONS

International Search Report dated Nov. 19, 2019 for the corresponding PCT Application No. PCT/JP2019/038403, with English translation.

*Primary Examiner* — Anil K Bhargava
(74) *Attorney, Agent, or Firm* — Michael Best & Friedrich LLP

(57) ABSTRACT

The optimal help content for a user and the work content is displayed. A server includes: a reception unit that receives a selection operation of a user for viewing help information; a display control unit that displays a help screen including the help information; and a help information storage unit that stores the help information and information of a work screen associated with the help information for each piece of the help information. The display control unit acquires help information associated with the work screen from the help information storage unit based on a work screen displayed on a user terminal when the reception unit receives the selection operation of the user, and displays a help screen including the acquired help information.

3 Claims, 14 Drawing Sheets

(51) Int. Cl.
 *G06F 3/04842* (2022.01)
 *G06F 11/34* (2006.01)

(56) References Cited

FOREIGN PATENT DOCUMENTS

JP     2011-238004 A    11/2011
JP     2017-079391 A     4/2017

* cited by examiner

FIG. 11

| SCREEN ID | HELP ITEM ID | | | HELP ITEM | CONTENT | DEFAULT PRIORITY | UPDATE PRIORITY |
|---|---|---|---|---|---|---|---|
| | FIRST HIERARCHY | SECOND HIERARCHY | THIRD HIERARCHY | | | | |
| W1 | 01 | 00 | 00 | INQUIRIES | ... | 1 | 4 |
| W1 | 02 | 00 | 00 | HOW TO USE TOP MENU | aaa | 2 | 1 |
| W1 | 03 | 00 | 00 | WHAT CAN BE DONE WITH "TOP MENU" | bbb | 3 | 2 |
| W1 | 04 | 00 | 00 | CREATE NEW SLIP | ... | 4 | 3 |
| W1 | 04 | 01 | 00 | WANT TO CREATE NEW INVOICE | ccc | 1 | 3 |
| W1 | 04 | 02 | 00 | WANT TO CREATE NEW INSTRUCTION SHEET | ddd | 2 | 2 |
| W1 | 04 | 03 | 00 | WANT TO CREATE NEW ESTIMATE | eee | 3 | 1 |
| ... | ... | ... | ... | ... | ... | ... | ... |
| W3 | 02 | 00 | 00 | SEARCH FOR CUSTOMER AND VEHICLE | – | 2 | 1 |
| W3 | 01 | 01 | 00 | SEARCH UNDER DETAILED SEARCH CONDITIONS | fff | 1 | 1 |
| W3 | 02 | 02 | 00 | SEARCH FOR VEHICLE | – | 2 | 1 |
| W3 | 02 | 02 | 01 | SEARCH BY VEHICLE IDENTIFICATION NUMBER | ggg | 1 | 1 |
| W3 | 02 | 02 | 02 | SEARCH BY PLATE No. | hhh | 2 | 2 |
| ... | ... | ... | ... | ... | ... | ... | ... |

| DATE AND TIME (YEAR, MONTH, DAY, HOUR, MINUTE, SECOND) | COMPANY ID | USER ID | SCREEN ID | SELECTION OPERATION /HELP ITEM |
|---|---|---|---|---|
| yyyymmddhhmmss | COMPANY A | PERSON a | W1 | F1 |
| yyyymmddhhmmss | COMPANY A | PERSON a | W1H1 | HOW TO USE TOP MENU |
| yyyymmddhhmmss | COMPANY A | PERSON a | W1H1 | CREATE NEW SLIP |
| yyyymmddhhmmss | COMPANY A | PERSON a | W1H2 | WANT TO CREATE NEW ESTIMATE |
| yyyymmddhhmmss | COMPANY A | PERSON b | W2 | F1 |
| yyyymmddhhmmss | COMPANY A | PERSON b | W2H1 | INPUT AND MODIFY ESTIMATE |
| ... | ... | ... | ... | ... |
| yyyymmddhhmmss | COMPANY A | PERSON c | W1H1 | CREATE NEW SLIP |
| ... | ... | ... | W1H2 | WANT TO CREATE NEW INVOICE |
| ... | ... | ... | ... | ... |
| yyyymmddhhmmss | COMPANY D | PERSON d | W1 | F1 |
| yyyymmddhhmmss | COMPANY D | PERSON d | W1H1 | CREATE NEW SLIP |
| yyyymmddhhmmss | COMPANY D | PERSON d | W1H2 | WANT TO CREATE NEW ESTIMATE |
| ... | ... | ... | ... | ... |

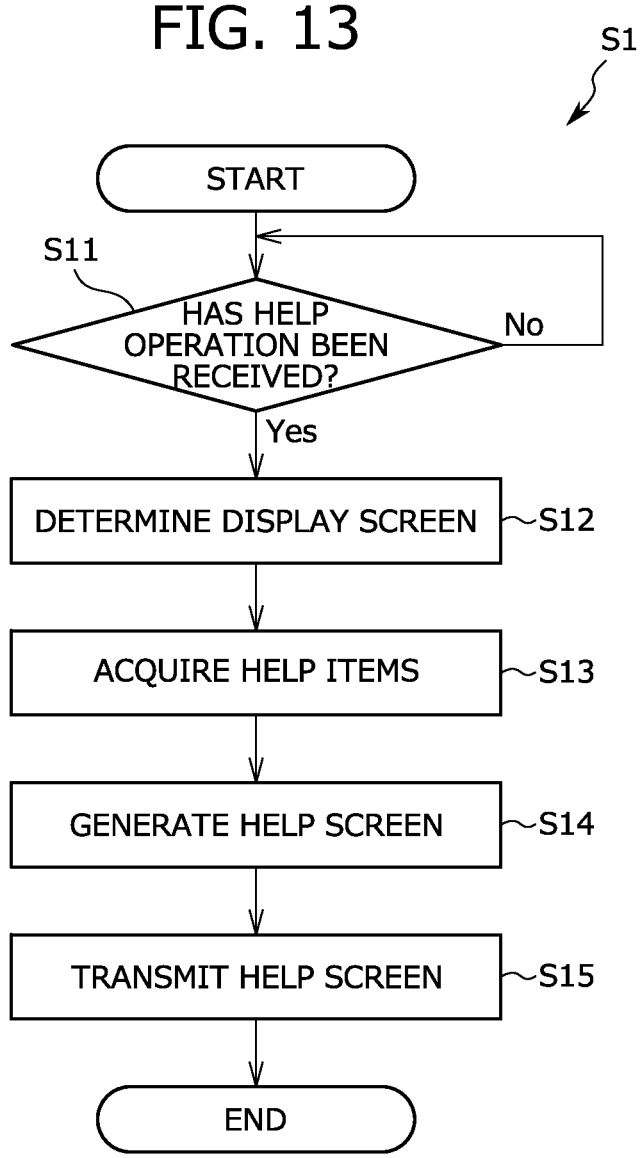

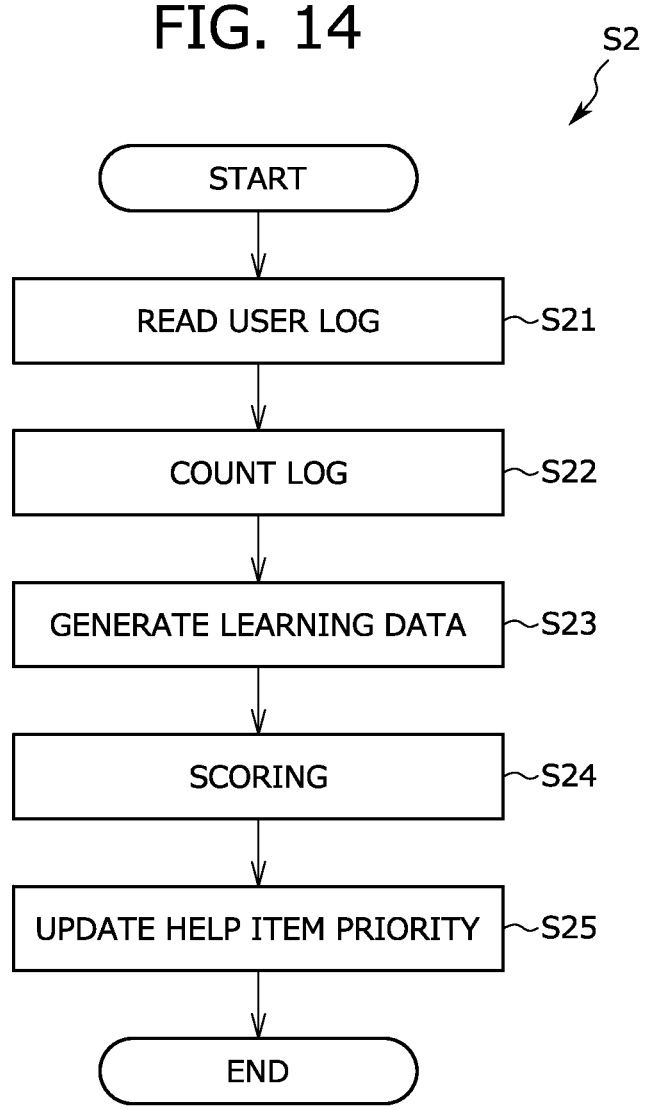

HELP INFORMATION DISPLAY SYSTEM, HELP INFORMATION DISPLAY METHOD, AND HELP INFORMATION DISPLAY PROGRAM

CROSS-REFERENCE TO RELATED APPLICATIONS

This application is entering into the national phase of PCT Application No. PCT/JP2019/038403, filed on Sep. 27, 2019. Further, this application claims the benefit of priority from Japanese Application No. 2018-184359, filed on Sep. 28, 2018, the entire contents of which are incorporated herein by reference.

TECHNICAL FIELD

The present invention relates to a help information display system, a help information display method, and a help information display program, and more particularly to a help information display system, a help information display method, and a help information display program for help information displayed on a work screen of a work application.

BACKGROUND ART

A user may need help information about how to use an application running on an information processing apparatus. In order to improve the usability of the user, it is desired that the user can easily find appropriate help information.

Therefore, PATENT LITERATURE 1 has proposed a help display device that acquires a character string on the user interface and uses the character string as a search keyword when displaying help, searches for help information using the search keyword, and displays the search result. In this manner, the user can display the desired help without the hassle of extracting the search keyword by himself or herself.

CITATION LIST

Patent Literature

PATENT LITERATURE 1: JP 2009-282817 A

SUMMARY OF INVENTION

Technical Problem

However, in the technique described in PATENT LITERATURE 1, the search work can be easily done by using the character string of the user interface, such as a screen or a window, but the help information that the user actually needs is not always preferentially displayed. In addition, it may take time for the user who uses the work application to reach the information that the user actually needs.

The present invention has been made in view of the aforementioned problems, and it is an object of the present invention to provide a help information display system, a help information display method, and a help information display program capable of displaying the optimal help content for the user and the optimal help content considering the work content being executed.

Solution to Problem

In order to solve the aforementioned problems, a help information display system according to the present invention is a help information display system that displays help information for supporting an operation of a user on a user terminal operated by the user. The help information display system includes: a reception unit that receives a selection operation of the user for viewing the help information; a display control unit that displays a help screen including the help information for supporting the user's operation; and a help information storage unit that stores the help information and information of a work screen associated with the help information for each piece of the help information. The display control unit acquires help information associated with the work screen from the help information storage unit based on the work screen displayed on the user terminal when the reception unit receives the selection operation of the user, and displays the help screen including the acquired help information.

In addition, in order to solve the aforementioned problems, a help information display method according to the present invention is a help information display method by a help information display system that displays help information for supporting an operation of a user. The help information display system includes a help information storage unit that stores the help information and information of a work screen associated with the help information for each piece of the help information. The help information display method includes: receiving a selection operation of the user for viewing the help information by the help information display system; acquiring, by the help information display system, help information associated with the work screen from the help information storage unit based on the work screen displayed on a user terminal operated by the user when the selection operation of the user is received; and displaying a help screen including the acquired help information on the user terminal by the help information display system.

In addition, in order to solve the aforementioned problems, a help information display program according to the present invention is a help information display program for displaying help information for supporting an operation of a user. The help information display program causes a computer including a help information storage unit that stores the help information for supporting the user's operation and information of a work screen associated with the help information for each piece of the help information to execute: a procedure for receiving a selection operation of the user for viewing the help information; a procedure for acquiring help information associated with the work screen from the help information storage unit based on the work screen displayed on a user terminal operated by the user when the selection operation of the user is received; and a procedure for displaying a help screen including the acquired help information on the user terminal.

According to the help information display system, the help information display method, and the help information display program, the help information corresponding to the work screen when the user displays the help screen can be displayed on the user terminal. Therefore, the user can refer to the help information relevant to the work being executed. As a result, the possibility of displaying the help information that the user wants to know is improved.

In the help information display system described above, preferably, the help information storage unit further stores a priority relevant to a display order of the help information for each piece of the help information, and the display control unit displays the help information associated with the work screen in descending order of the priority.

Therefore, since the help information is displayed in descending order of priority on one help screen, the possibility of preferentially displaying the help information that the user wants to know is improved.

In addition, preferably, the help information display system described above further includes: a log generation unit that generates a user log including screen identification information, by which the work screen on which the user has performed the selection operation can be identified, and help information identification information for identifying the viewed help information; a user log storage unit that stores the log generated by the log generation unit; and a statistical processing unit that counts the user log stored in the user log storage unit, counts the number of views of user information for each work screen, and calculates the priority of the help information based on the number of views.

By providing the above components, it is possible to display the optimal help information for the user, which is determined based on the accumulated help operation history of the user.

In addition, preferably, the help information display system described above further includes: a learning unit that learns a relationship between the work screen and the help information and creates learning data based on the user log stored in the user log storage unit; and a scoring processing unit that predicts, based on the learning data, help information required by the user on the work screen when the selection operation of the user is received, and the display control unit displays the help screen including the help information predicted by the scoring processing unit.

By learning the accumulated help operation history of the user in this manner, it is possible to display the optimal help information that more reflects the user's past help operations for each work screen.

In addition, in the help information display system described above, preferably, as the help information, a QR code (registered trademark) corresponding to the work screen is provided. Preferably, when the reception unit receives the QR code from a second user terminal, the display control unit transmits a video file corresponding to the QR code to the second user terminal to make the video file playable.

By making it possible to play the video on the second user terminal different from the user terminal in this manner, even a user who is unfamiliar with the operation can continue the work on the user terminal and learn the operation while checking the explanatory video on the second user terminal. Therefore, it is possible to reliably perform work operations, and work efficiency is improved.

Advantageous Effects of Invention

According to the present invention, it is possible to display the optimal help content for the user and the optimal help content relevant to the work content being executed.

BRIEF DESCRIPTION OF DRAWINGS

FIG. 11 is a diagram showing an example of a help item data table.
FIG. 12 is a diagram showing an example of a user log database.
FIG. 13 is a flowchart of a help screen display control process.
FIG. 14 is a flowchart of a statistical and scoring process.

DESCRIPTION OF EMBODIMENTS

Hereinafter, a work system 1 including a server 10 as a help information display system according to an embodiment (the present embodiment) of the present invention will be described with reference to FIGS. 1 to 14. In addition, the embodiment described below is an example for facilitating the understanding of the present invention, and does not limit the present invention. That is, it is needless to say that the present invention can be modified and improved without departing from the spirit of the present invention and the present invention includes equivalents thereof.

[Overall Configuration of the Work System 1]

Figure 1:
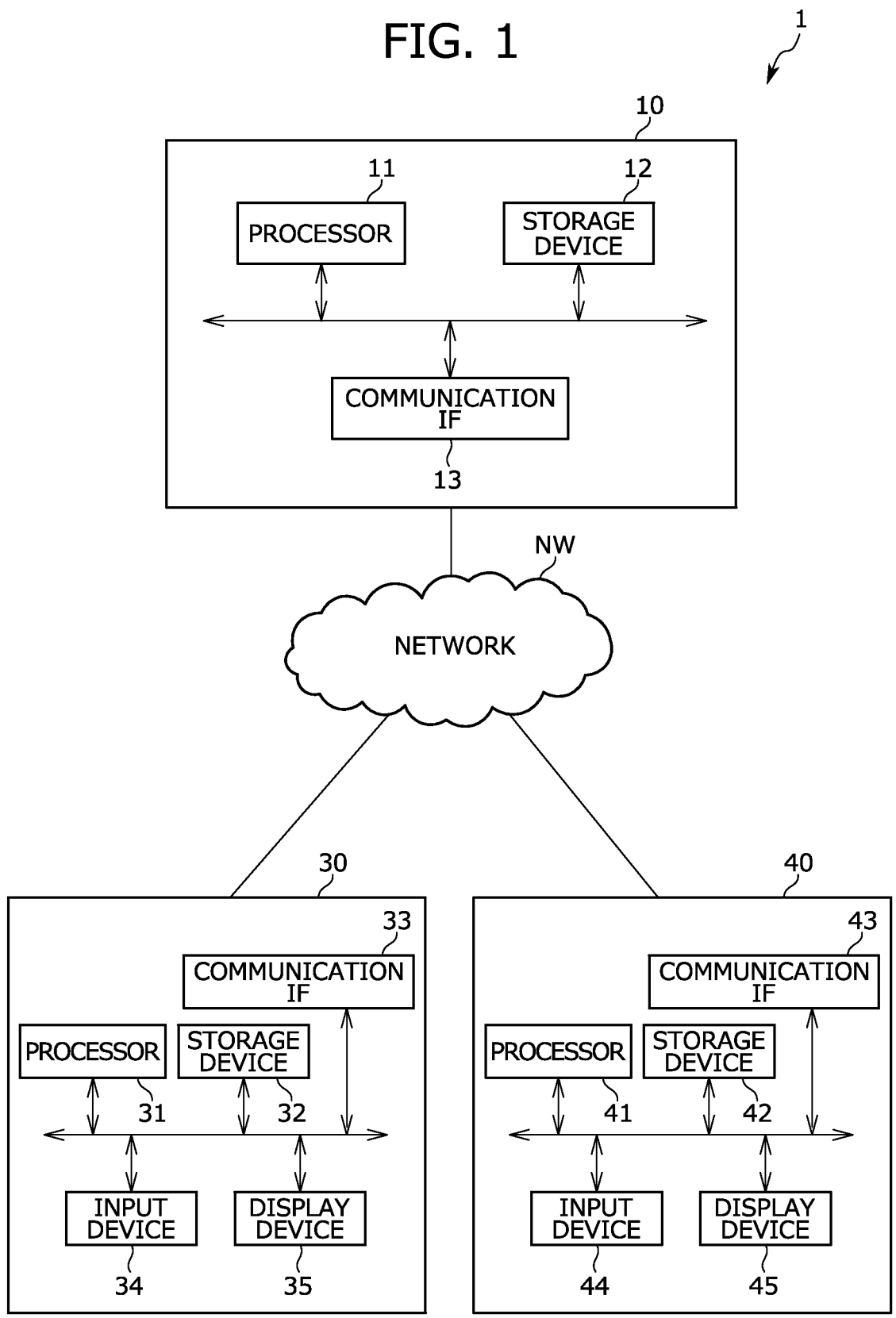
FIG. 1 is an overall configuration diagram of a work system.

As illustrated in FIG. 1, the work system 1 includes, as an example, the server 10, a user terminal 30, and a user assistant terminal 40 as a second user terminal. The server 10, the user terminal 30, and the user assistant terminal 40 are communicably connected to each other through a network NW.

The server 10 is an aspect of the help information display system according to the present invention. The help information display system is a system that supports user operations. In addition, the server 10 is a cloud server that provides a software service to the user terminal 30 connected through the network NW.

Specifically, the server 10 provides a work application relevant to the user's work to the user terminal 30 as an example of the software service. At this time, when there is a point that the user does not understand about the work or the operation method, the server 10 presents a help screen for displaying help information to the user terminal 30 in response to the user's request. Then, the display content of the help screen is optimized and displayed according to the work screen when the help screen is displayed or the past operation history of the user, so that the user's curiosity is promptly resolved. In addition, the details of the help screen display process will be described later.

Here, the "help screen" is a screen for displaying help information. A first help screen, a second help screen, and a third help screen, which will be described later, are examples of the help screen.

The "help information" is a work name, a question, and the like that the user wants to know about the work or the system operation, and includes a "help item" as a character string, a QR code described later, and an answer to the question.

The "help item" is mainly a systematic classification of the operation content relevant to the work content or a question regarding the operation method of the work system 1, and may have hierarchies. For example, help items in the first hierarchy include "create new slip", "create application forms", and "how to use top menu", which are large classification items of the work content. In the present embodiment, the hierarchies are set up to the third hierarchy, but are not limited thereto.

The "menu screen" is a screen for displaying a top menu to selectably display the work that can be executed in the work system 1. For example, a menu screen W1 described later corresponds to an example of the "menu screen".

The "work screen" is a screen for executing the work. A slip creation screen W2 for creating slip such as an estimate or an invoice, which will be described later, or a search screen W3 for searching for the created slip corresponds to an example of the "work screen". In addition, in this specification, all the screens displayed on the user terminal before displaying the help screen are included, and in a broad sense, the above-described "menu screen" is also included.

The user terminal 30 and the user assistant terminal 40 are computers such as a PC, a smartphone, and a tablet terminal operated by the user. The user terminal 30 and the user assistant terminal 40 are connected to the server 10 through the network NW, and receive software services from the server 10.

[Hardware Configuration of the Server 10]

As illustrated in FIG. 1, the server 10 is a computer including a processor 11, a storage device 12, and a communication interface 13.

The processor 11 is hardware (for example, a CPU) for executing an instruction set described in a program. Then, the processor 11 executes various arithmetic processes based on programs or data stored in the storage device 12, and controls each unit of the server 10.

The storage device 12 is configured to include, for example, a memory and a magnetic disk device, and stores various kinds of programs or data. As an example, the storage device 12 stores data, such as a help item data table described later. In addition, the storage device 12 is also used as a work memory of the processor 11. In addition, the storage device 12 may include an information storage medium, such as a flash memory or an optical disk.

The communication interface 13 is configured to include, for example, a network interface card, and communicates with a computer, such as the user terminal 30 and the user assistant terminal 40, through a communication network such as the Internet or an intranet.

[Hardware Configurations of the User Terminal 30 and the User Assistant Terminal 40]

As illustrated in FIG. 1, the user terminal 30 includes a processor 31, a storage device 32, a communication interface 33, an input device 34, and a display device 35. In addition, the input device 34 and the display device 35 may be provided as external devices of the user terminal 30.

The user assistant terminal 40 corresponds to a second user terminal, and includes a processor 41, a storage device 42, a communication interface 43, an input device 44, and a display device 45. In addition, the input device 44 and the display device 45 may be provided as external devices of the user assistant terminal 40.

Since the user assistant terminal 40 has the same hardware configuration as the user terminal 30, the configuration of each unit of the user terminal 30 will be described below, and the description of the configuration of each unit of the user assistant terminal 40 will be omitted.

The processor 31 is hardware (for example, a CPU) for executing an instruction set described in a program. Then, the processor 31 executes various arithmetic processes based on programs or data stored in the storage device 32, and controls each unit of the user terminal 30.

The storage device 32 is configured to include, for example, a memory and a magnetic disk device, stores various kinds of programs or data, and also functions as a work memory of the processor 31. In addition, the storage device 32 may include an information storage medium, such as a flash memory or an optical disk.

The communication interface 33 is configured to include, for example, a network interface card, and communicates with a computer, such as the server 10, through a communication network such as the Internet or an intranet.

The input device 34 is configured to include, for example, a touch panel, a keyboard, and a mouse, and receives an input from the user.

The display device 35 is configured to include, for example, a liquid crystal display device and an organic EL display device, and outputs a screen based on graphic data generated by the processor 31.

For example, screens shown in FIGS. 2 to 8 described later are examples of the screen displayed on the display device 35.

[Overview of Processing in the Work System 1]

Next, an overview of the processing in the work system 1 will be described with reference to the screen examples of FIGS. 2 to 8 and FIG. 9. In the present embodiment, an example of searching for a procedure necessary for the user to perform a desired work will be described.

First, the user terminal 30 accesses the server 10 to start a software service (work application) relevant to the user's work and logs in. Then, the server 10 displays the menu screen W1 shown in FIG. 2 on the display device 35 of the user terminal 30. The menu screen W1 is a screen for displaying a top menu corresponding to the highest hierarchy of the user's work.

Figure 2:
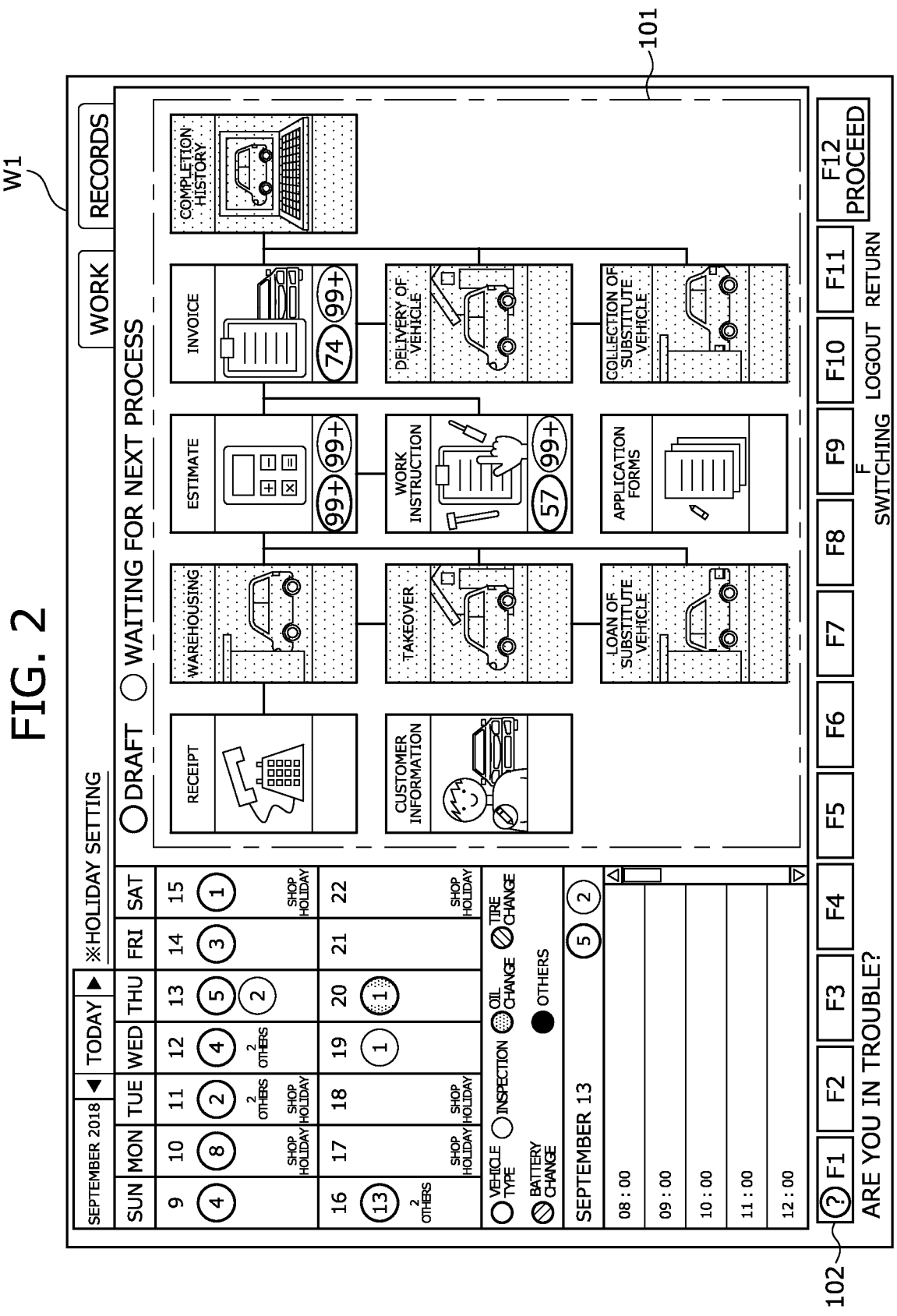
FIG. 2 is a diagram showing an example of a menu screen.

As shown in FIG. 2, on the menu screen W1, a work icon indicating each work of the user is expressed by a flow diagram in a form along the work flow. In this work flow diagram, work items and work flows according to the roles (positions, job types, and the like) of users logging in to the work system are displayed. By displaying the menu screen in the form of such a work flow diagram, the user can perform the work according to the standard flow. Therefore, it can be expected that the efficiency of the work will be improved.

The menu screen W1 includes a work icon group 101 and a help icon 102.

The work icon group 101 includes a plurality of icons (reference numerals are omitted) corresponding to each work provided to the user terminal 30 by the server 10. By pressing the icon of the desired work, the user can transition to the work screen of the target work and perform the work.

The help icon 102 is an object for displaying a help screen. The user presses the help icon 102 to display a help screen described later. In addition, the help screen can also be displayed by pressing a predetermined key on the keyboard, for example, F1.

In addition, "pressing" includes all of an operation of selecting an icon displayed on the display with a mouse, an operation of selecting an icon by directly touching the icon, and an operation of selecting an icon by pressing a key on the keyboard.

Figure 3:
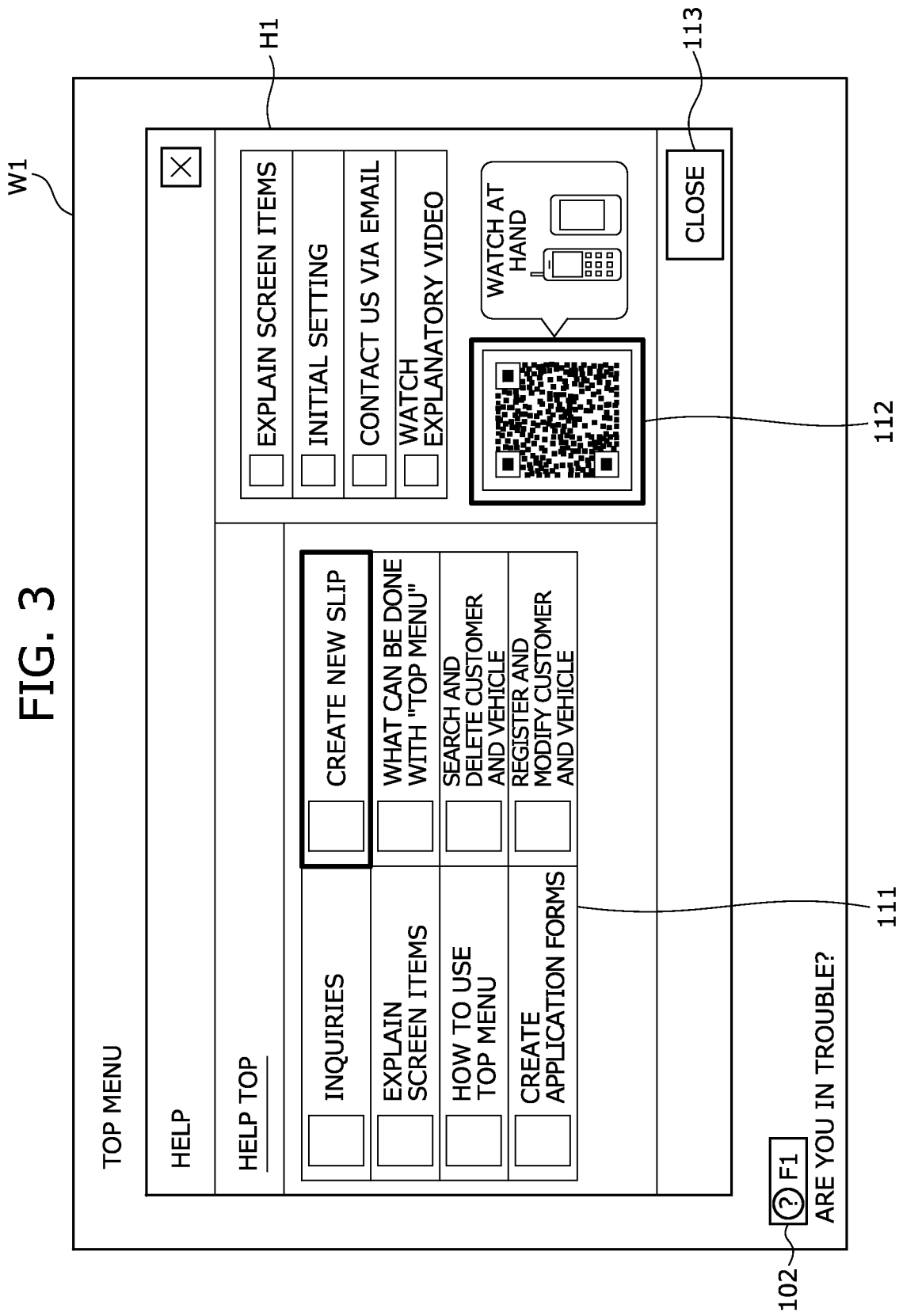
FIG. 3 is a diagram showing an example of a help screen.

When the help icon 102 on the menu screen W1 or F1 on the keyboard is pressed, the server 10 pops up a help screen H1 shown in FIG. 3 on the menu screen W1. The function of popping up the help screen H1 when the help icon 102 or F1 on the keyboard is pressed as described above is the same as for work screens other than the menu screen W1, for example, the slip creation screen W2 and the search screen W3. By performing the same operation on each work screen, a help screen H2 and a help screen H3 are displayed (see FIGS. 5 and 7).

In this screen example, the help screens H1, H2, and H3 are displayed on the menu screen W1, the slip creation screen W2, and the search screen W3 that are work screens when the help screen is called, respectively. However, the display form is not limited thereto. For example, the screen display may be switched from the work screen to the help screen.

As shown in FIG. 3, the first help screen H1 includes a help item display area 111, a QR code display area 112, and a close button 113.

The help item display area 111 is a display area for displaying help items in the first hierarchy associated with each work screen. That is, the server 10 displays help items in the first hierarchy associated with the menu screen W1, which is a work screen, in the help item display area 111 of the first help screen H1. In the present embodiment, as examples of the help item associated with the menu screen W1, as shown in FIG. 3, "inquiries", "create new slip", "explain screen items", "what can be done with 'top menu'", "how to use top menu", "search and delete customer and vehicle", "create application forms", and "register and modify customer and vehicle" are displayed in this order.

The QR code display area 112 is a display area for displaying the QR code. The QR code is a code for displaying a video explaining the answers to the help items associated with the work screen. In the example shown in FIG. 3, the server 10 displays a QR code for playing an explanatory video of a help item associated with the menu screen W1. When the user shoots the displayed QR code with a terminal such as a smartphone other than the user terminal 30, the explanatory video can be played.

When the QR code displayed in the QR code display area 112 of the first help screen H1 is read, as an example, an explanatory video answering "how to use top menu" and "what can be done with 'top menu'" among the help items is played. The user can check and operate the screen of the display device 35 of the user terminal 30 while checking the video on a terminal, such as a smartphone other than the user terminal 30 executing the work system 1. In this manner, the answers to the help items can be checked on a terminal other than the user terminal 30. Therefore, even a user who is unfamiliar with the operation can learn the operation while checking the explanatory video, so that it is possible to perform the operation reliably. As a result, operability and work efficiency are significantly improved as compared with a case where the help screen H1 is temporarily closed to resume the work on the user terminal 30 after checking the answer to the help item on the first help screen H1 of the user terminal 30.

The close button 113 is an object for closing the first help screen H1.

When, for example, the help item "create new slip" is selected from the help items of the first help screen H1, the server 10 switches the display to a second help screen H11 for displaying help items in the second hierarchy, which is a hierarchy immediately below the help item "create new slip".

Figure 4:
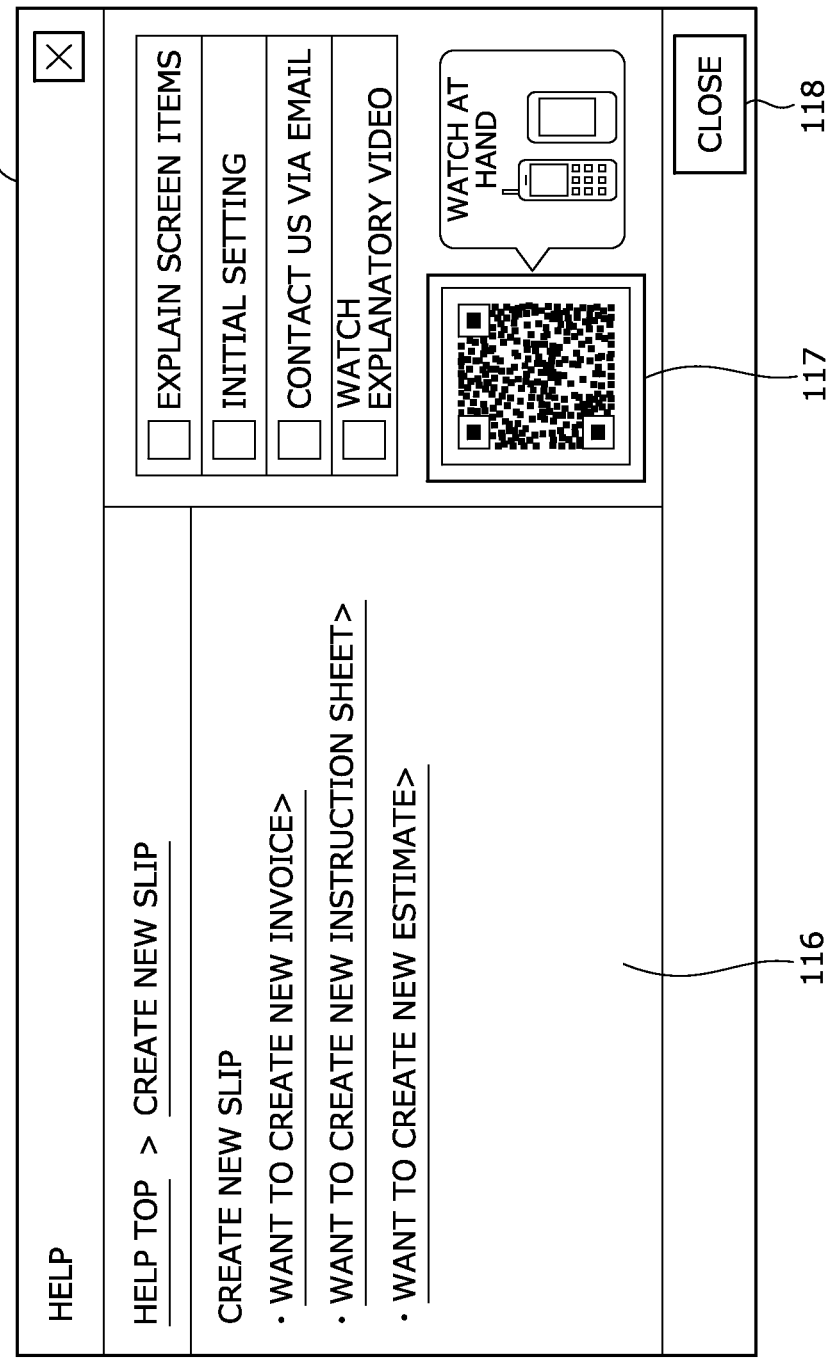
FIG. 4 is a diagram showing an example of a help screen.

As shown in FIG. 4, the second help screen H11 includes a help item display area 116, a QR code display area 117, and a close button 118.

The help item display area 116 is a display area for displaying help items associated with each help item pressed (selected) on the first help screen. As examples of the help item associated with "create new slip", as shown in FIG. 4, help items such as "want to create new invoice", "want to create new instruction sheet", and "want to create new estimate" are displayed in this order.

When any of the help items is selected, if there is a help item in the third hierarchy that is a hierarchy immediately below the second hierarchy, the display is switched to a screen for displaying help items in the third hierarchy. If there is no lower hierarchy, transition to the support site content to display information including the answer to the selected help item in the second hierarchy is performed.

The QR code display area 117 is an area for displaying the QR code. In the example shown in FIG. 4, a QR code capable of playing a video relevant to "create new slip" is supplementarily displayed. Since the fact that the video can be played by reading the QR code is the same as that described in the first help screen H1, the description will be omitted.

Figure 5:
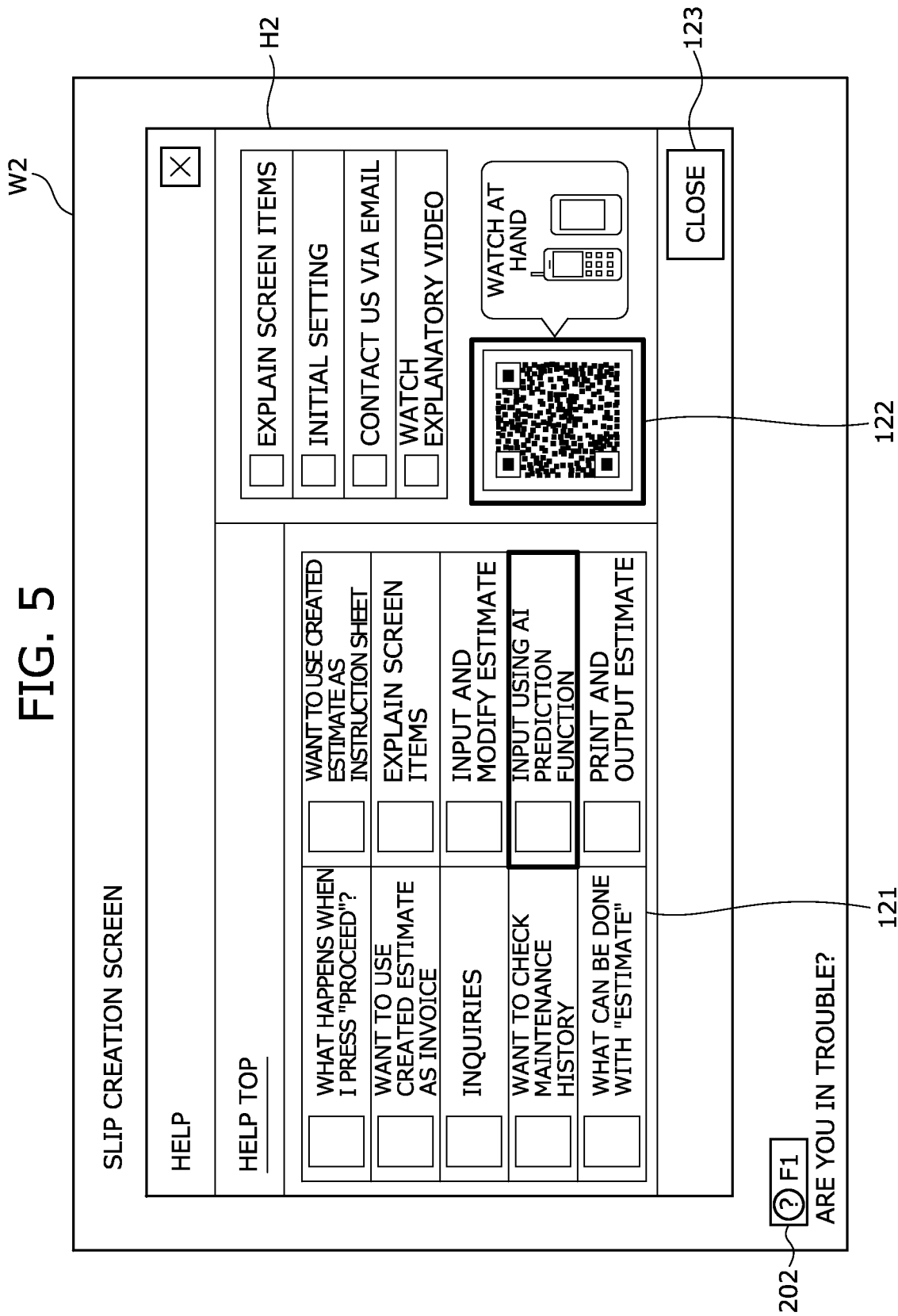
FIG. 5 is a diagram showing an example of a help screen.

FIG. 5 shows the first help screen H2 displayed on the slip creation screen W2 as an example of the work screen. When a help icon 202 on the slip creation screen W2 or F1 on the keyboard is pressed, the first help screen H2 is displayed. Similarly to the first help screen H1, the first help screen H2 includes a help item display area 121, a QR code display area 122, and a close button 123. Since each display area and the button are the same as those on the first help screen H1, the description thereof will be omitted.

Figure 6:
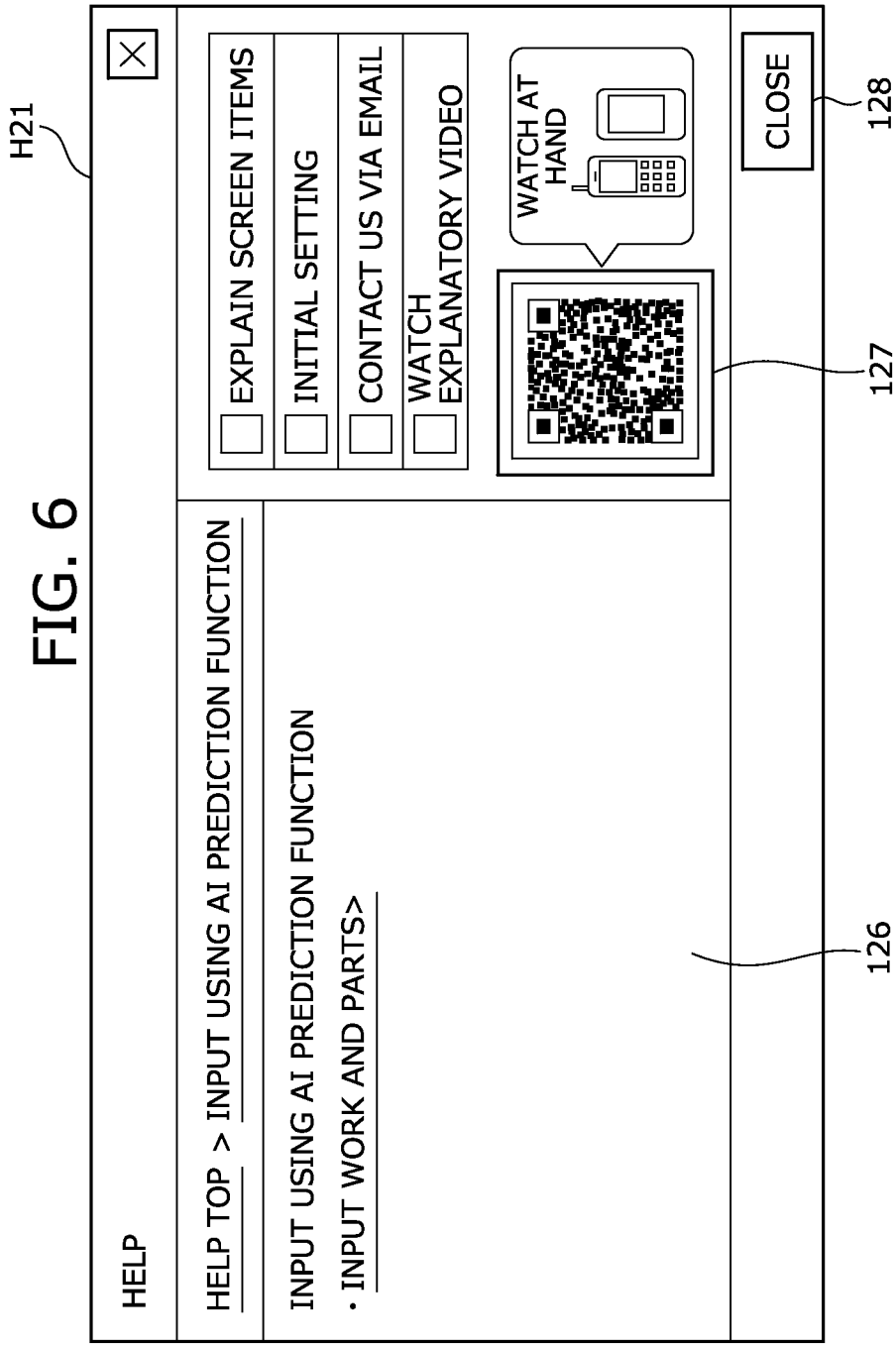
FIG. 6 is a diagram showing an example of a help screen.

FIG. 6 is an example of the second help screen, and shows a second help screen H21 that is displayed when the help item "input by AI prediction function" is selected from the first help screen H2. Similarly to the second help screen H11, the second help screen H21 includes a help item display area 126, a QR code display area 127, and a close button 128.

Figure 7:
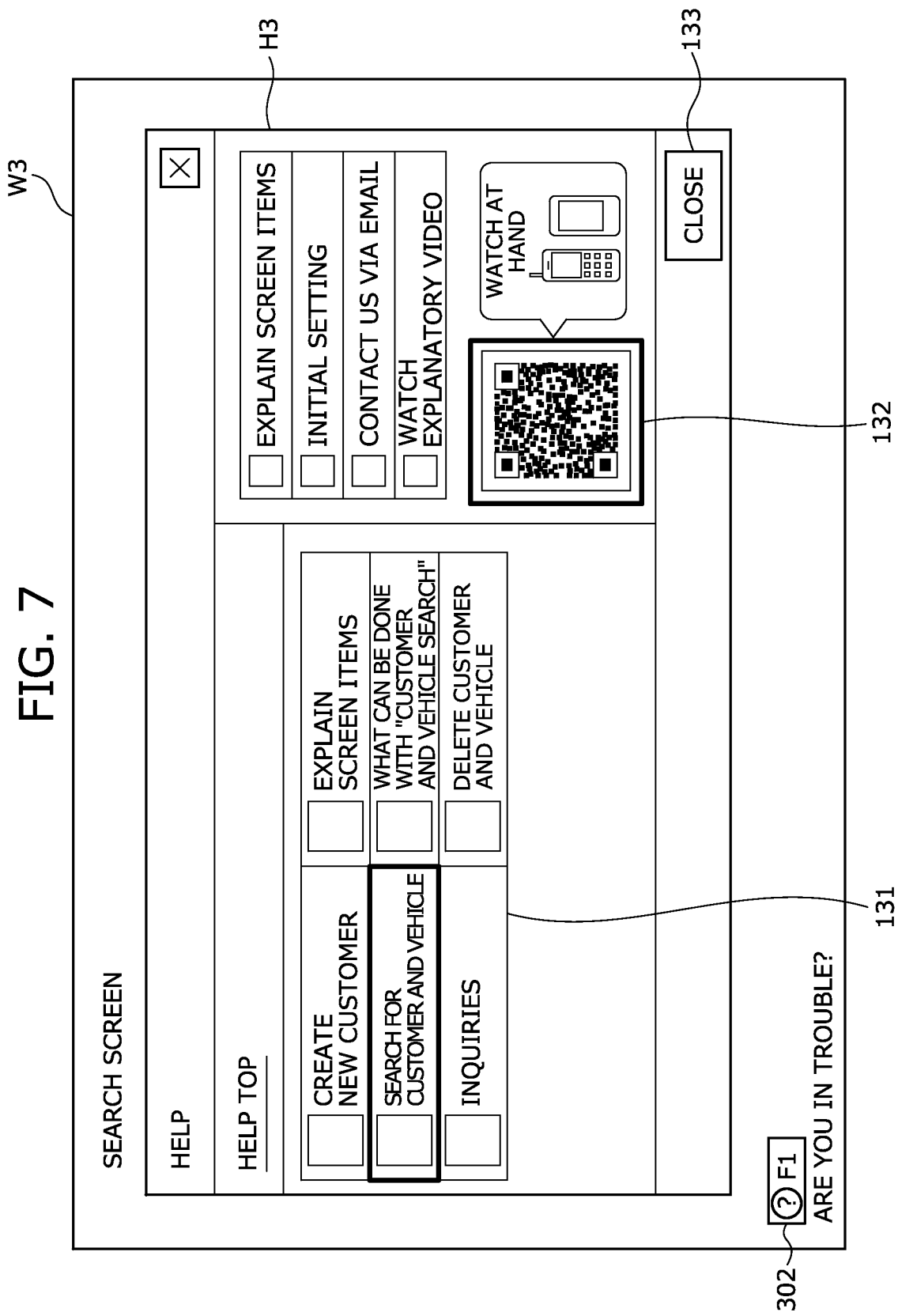
FIG. 7 is a diagram showing an example of a help screen.

FIG. 7 shows the first help screen H3 displayed on the search screen W3 as an example of the work screen. When a help icon 302 on the search screen W3 or F1 on the keyboard is pressed, the first help screen H3 is displayed. Similarly to the first help screen H1, the first help screen H3 includes a help item display area 131, a QR code display area 132, and a close button 133. Since each display area and the button are the same as those on the first help screen H1, the description thereof will be omitted.

Figure 8:
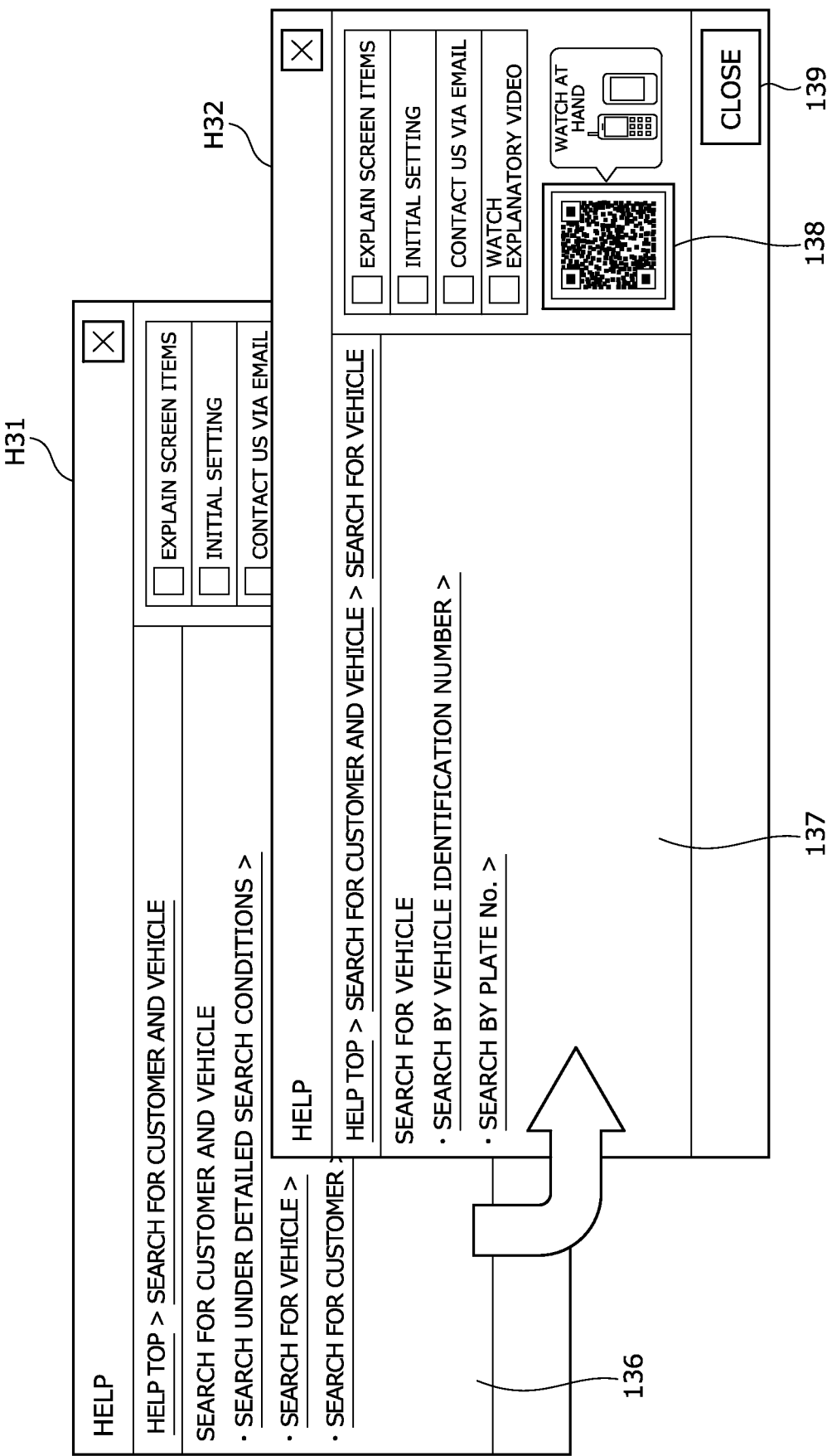
FIG. 8 is a diagram showing an example of a help screen.

A screen H31 shown in FIG. 8 is an example of the second help screen, and shows the second help screen H31 that is displayed when the help item "search for customer and vehicle" is selected from the first help screen H3. Similarly to the second help screen H11, the second help screen H31 includes a help item display area 136, a QR code display area (not shown), and a close button (not shown).

FIG. 8 further shows a third help screen H32 that is displayed when the help item "search for vehicle" is selected from the second help screen H31. The third help screen H32 is a screen that is displayed when there is a help item in the third hierarchy that is a hierarchy immediately below the second hierarchy. Similarly to the second help screen H31, the third help screen includes a help item display area 137, a QR code display area 138, and a close button 139.

Thus, when the pressing of a help item on each of the help screens described above (the first help screens H1, H2, and H3, the second help screen H11, H21, and H31, and the third help screen H32) is received, the server 10 causes the display device 35 of the user terminal 30 to display the help screen of the next hierarchy or transition to the support site content for the answer. In addition, when a QR code is received, the server 10 causes the display device 45 of the user assistant terminal 40 to display the corresponding explanatory video so that the explanatory video can be played.

As a result, the user can refer to the information that the user wants to know about the work or the system operation.

[Display of Help Items]

Next, the content of help items to be displayed on each help screen and the display order thereof will be described. Since the method of displaying help items displayed on each help screen is the same, the display of help items on the first help screen H1 displayed on the menu screen W1 will be described below as an example.

Regarding help items to be displayed, each work screen is associated with help items displayed on the work screen, and corresponding help items, that is, associated help items are displayed on the help screen (pop-up) for each work screen. In addition, the display order of help items, that is, the display priority (priority) is set.

The association between the work screen and the help item and the display priority are stored in a help item data table T1 described later.

The association between the work screen and the help item and the display order are registered in advance. Immediately after the introduction of the work system 1, help items to be displayed are extracted based on the association information registered in advance, and are displayed according to the display order, specifically, in descending order of priority.

Figure 9:
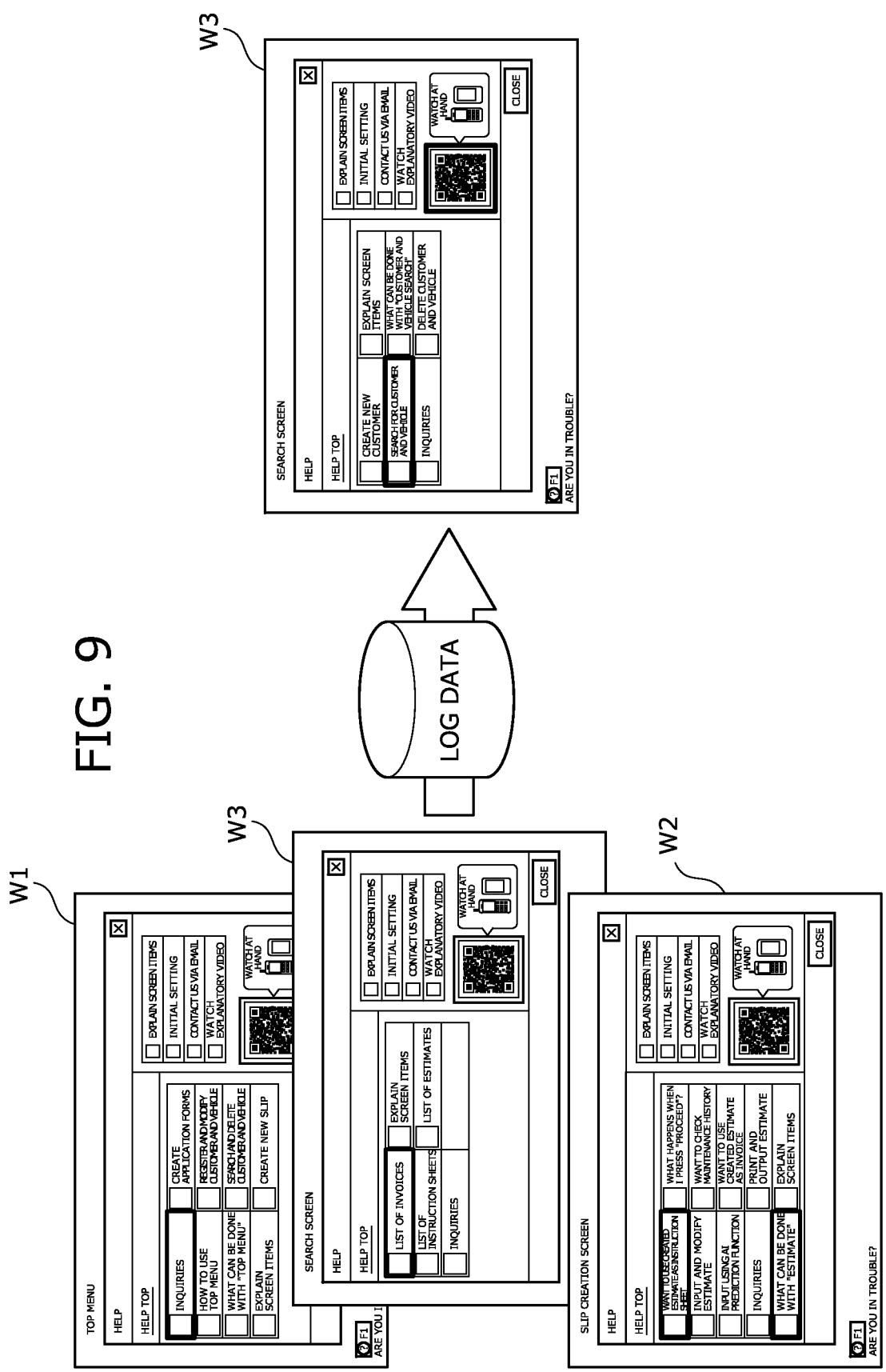
FIG. 9 is a diagram illustrating the concept of help information display processing.

In addition, as illustrated in FIG. 9, with the use of the work system 1, user log data of all users are acquired and accumulated, it is counted for each work screen and each help item which help item the users have actually selected and viewed on which work screen, and information of the association between the work screen and the help item is updated. For the association information, as an example, the number of views on each help item can be counted for each work screen, and the priority can be set from the help item with the highest number of times, that is, the help item with the highest reference frequency.

In addition, the help operation history of the user is learned from the user log, the next work to be performed by the user is predicted from the learning result, and the help items to be displayed are changed and the order of each help item is changed. Therefore, help items predicted to be needed when the user is operating the work system 1 can be displayed in the display order predicted to be viewed by the user. As a result, the display of help information can be optimized.

User log counting and learning can be performed for all users, in user company units, or in individual user units. The system may be fixed as to which unit's counting and learning results are to be used to perform optimal help display, or this may be selectable by the user at the time of system setting.

[Function of the Server 10]

Next, the function of the server 10 for realizing the above processing will be described with reference to FIG. 10.

Figure 10:
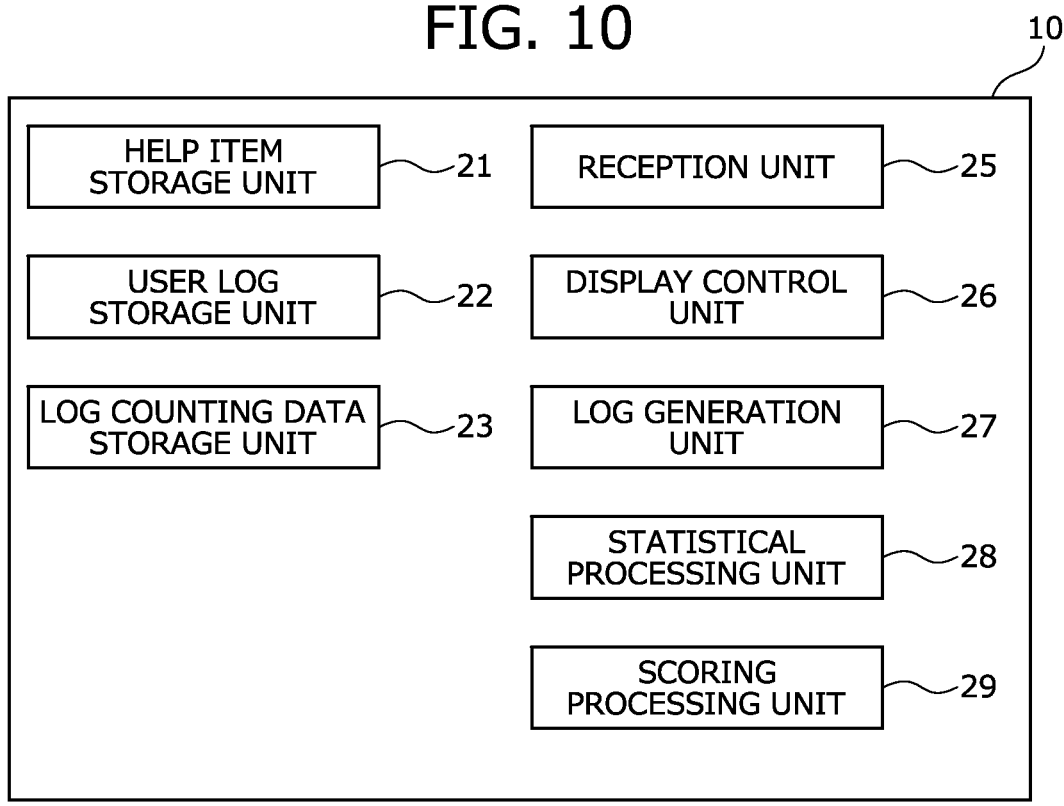
FIG. 10 is a diagram describing the function of a server.

As illustrated in FIG. 10, as an example, the server 10 includes a help item storage unit 21, a user log storage unit 22, a log counting data storage unit 23, a reception unit 25, a display control unit 26, a log generation unit 27, a statistical processing unit 28, and a scoring processing unit 29.

The functions of the above-described units provided in the server 10 are realized by the processor 11 controlling each unit of the server 10 based on a help information display program and various kinds of data stored in the storage device 12. In addition, the server 10 may read the help information display program from a computer-readable information storage medium, or may receive the help information display program through a communication network such as the Internet or an intranet.

In addition, a help information display method according to the present invention is realized by the server 10 executing the process based on the help information display program described above.

Hereinafter, the details of the functions of the above-described units provided in the server 10 will be described.

[Help Item Storage Unit 21]

The help item storage unit 21 stores information including help items, hierarchies of help items, and answers to help items. The help item storage unit 21 corresponds to a help information storage unit.

The "help item" is mainly a systematic classification of the operation content relevant to the work content or a question regarding the operation method of the work system 1. For example, the "help item" may be a combination of questions and answers, such as FAQ and Q&A.

Help items and answers thereto are registered in advance. However, FAQ information may be accumulated by additionally updating specific cases in response to inquiries from users at any time.

The help item storage unit 21 is mainly realized by the storage device 12 of the server 10. Specifically, the storage device 12 stores the help item data table T1.

FIG. 11 shows an example of the help item data table T1. As shown in FIG. 11, a help item ID for identifying a help item, a help item (question), content information as answer information, a default priority, and an update priority are stored in the help item data table T1.

Values are assigned to the help item ID so that the work screen to be displayed, that is, the associated work screen, and the hierarchy can be identified from the content.

Help items are text information. Answers may be stored as text information. In this example, however, the answers are prepared as content, such as characters, still images, videos, and sounds, including answer information. Therefore, information by which the content can be referred to, for example, information such as directory information or file name, is stored in this table.

The default priority and the update priority are display priorities of help items, that is, values indicating the priority. The default priority is a default priority value, and the update priority is a priority value updated with a value calculated by the statistical processing unit and the scoring processing unit described later.

The help item storage unit 21 further stores video data (not shown) of an explanatory video, which is displayed when the QR code is read, as information corresponding to the QR code.

[User Log Storage Unit 22]

The user log storage unit 22 stores information including user logs relevant to user operations in the work system 1. The user log storage unit 22 is mainly realized by the storage device 12 of the server 10. Specifically, the storage device 12 stores a user log database T2.

FIG. 12 shows an example of the user log database T2. The user log is information that is output from the server 10 at the timing when an event based on the operation when the user operates the work system 1 occurs, and includes the help operation history of the user. The help operation history of the user is history information when the user performs a selection operation. As an example, as shown in FIG. 10, date and time (year, month, day, hour, minute, second), user company ID, user ID, screen ID, and selection operation/help item are stored.

In the screen ID, for example, identification information of a work screen displayed when the user performs a selection operation is output as a help operation history. In addition, in the selection operation/help item, for example, a help item ID of a help item pressed by the user is output as a help operation history. The user log database T2 is used in the statistical processing unit 28, which will be described later, to analyze the relationship between the screen ID and the help item ID and the number of views (access frequency) on the help item from the information recorded in the user log. The selection operation/help item corresponds to help information identification information.

[Log Counting Data Storage Unit 23]

The log counting data storage unit 23 stores information obtained by counting the user logs of all users of the work system 1. The log counting data storage unit 23 is mainly realized by the storage device 12 of the server 10. Specifically, the storage device 12 stores a log counting database (not shown).

In addition, the log counting database is information created by counting the user log database T2 in a log counting process executed by the statistical processing unit 28, which will be described later.

In the log counting database, a value of the total number of times of viewing (pressing/selection on the screen) by the users is stored for each help item. This indicates a frequency of how many times each help item has been viewed. In addition, the counting result is stored as information from which each counting result for all users, for each user company, or for each individual user can be seen. Additional information (identification information) from which it can be seen that the counting result is a value for all users, for each user company, or for each individual user may be held in each record on the data, or each counting result for all users, for each user company, or for each individual user may be held as separate files.

[Reception Unit 25]

The reception unit 25 receives the user's operation.

The user's operation is an input operation performed by using the input device 34 such as a keyboard, a mouse, or a touch panel of the user terminal 30 when the user executes the work system 1. For example, the user's operation includes an operation of pressing F1 to display the help screen or an operation of selecting an item that the user wants to know from the displayed help items. Here, the operation of pressing F1 to display the help screen and the operation of pressing (selecting) a help item that the user wants to know are referred to as "user's selection operation". That is, the "user's selection operation" includes a help screen display request to display the help screen, a help item display request to display the help item, and an answer display request to display the answer corresponding to the help item.

The reception unit 25 is mainly realized by the processor 11 and the communication interface 13 of the server 10.

Specifically, the processor 11 receives the user's selection operation from the user terminal 30 through the communication interface 13.

The reception unit 25 further receives information from the user assistant terminal 40.

Specifically, when the QR code is read by the user assistant terminal 40, the information of the QR code is received.

[Display Control Unit 26]

When the reception unit 25 receives the user's selection operation from the user terminal 30, the display control unit 26 acquires information to be displayed on the help screen to be displayed on the display device 35 of the user terminal 30 and generates a screen to be displayed.

The display control unit 26 is mainly realized by the processor 11, the storage device 12, and the communication interface 13 of the server 10.

Specifically, when the reception unit 25 receives the user's selection operation, help items corresponding to the work screen, that is, help items associated with the work screen, and the priority (priority regarding the display order) of the help items are acquired with reference to the help item data table T1 based on the work screen displayed on the display device 35 of the user terminal 30.

For example, when the work screen displayed on the display device 35 is the menu screen W1 and a user's selection operation is received, help items associated with the menu screen W1 are acquired. Similarly, when another work screen, for example, the slip creation screen W2 or the search screen W3 is displayed and a user's selection operation is received, help items associated with each work screen is acquired.

When the user's selection operation is received during the display of the help screen (first help screen) of the first hierarchy and the help screen (second help screen) of the second hierarchy is displayed, corresponding help items and the priority (display order) are acquired with reference to the help item data table based on the work screen and the help item pressed (selected) in the first hierarchy.

When there is a further lower hierarchy, corresponding help items and the priority (display order) are acquired with reference to the help item data table based on the work screen and the help item pressed (selected) in each hierarchy.

Then, the display control unit 26 generates a help screen based on the acquired help items and priority information, and displays the help screen on the display device 35 of the user terminal 30 through the communication interface 13.

In addition, when the user assistant terminal 40 reads the QR code and the reception unit 25 receives a help information display request from the user assistant terminal 40, the display control unit 26 acquires a video file linked to the QR code from the storage device 12 and displays the video file on the display device 45 of the user assistant terminal 40 through the communication interface 13.

[Log Generation Unit 27]

The log generation unit 27 performs so-called logging (operation recording) by generating a user operation received by the reception unit 25 as a user log and storing the user operation in the user log storage unit 22.

The log generation unit 27 is mainly realized by the processor 11 of the server 10, the storage device 12, and the communication interface 13.

Specifically, the log generation unit 27 acquires necessary information from the operation information such as the user selection operation received by the reception unit 25, and stores the user company ID, the user ID, the date and time (year, month, day, hour, minute, second) when the selection operation was performed by the user, the screen ID, and the selection operation/help item in the user log database T2. In addition, these items stored in the user log database T2 are examples and can be changed as appropriate.

[Statistical Processing Unit 28]

The statistical processing unit 28 counts the log data of the user log database T2 in the user log storage unit 22.

The statistical processing unit 28 is mainly realized by the processor 11 and the storage device 12 of the server 10.

Specifically, the statistical processing unit 28 counts the log data of the user log database T2 for each help item, and calculates the number of times each help item has been viewed (accessed) by the user. Then, the counting result is stored in the log counting data storage unit 23 as the total number of views. In addition, the statistical processing unit 28 also functions as a learning unit, and creates learning data based on the log data of the user log database T2.

In addition, as a counting unit and a learning unit, the total number of views for each help item for all users, the total number of views for each user company and each help item, and the total number of views for each user (individual) and each help item may be counted, respectively.

[Scoring Processing Unit 29]

The scoring processing unit 29 assigns a score (priority) to each help item based on the log counting database of the log counting data storage unit 23 and other pieces of information.

The scoring processing unit 29 is mainly realized by the processor 11 and the storage device 12 of the server 10.

Specifically, the scoring processing unit 29 determines a work screen to be displayed and the priority for each help item based on a predetermined rule. Then, the help item data table T1 is updated with the determined work screen and priority. In this manner, since the work screen to be displayed and the priority are given to each help item, the help items relevant to the work screen that the user wants to know are displayed on the help screen according to the priority.

In addition, for example, from user information separately stored in the server 10, companies of the same size as a target user company may be grouped, and the work screen and the priority may be set in consideration of the number of views in the companies of the same group. In this case, determination on the same size can be made based on information, such as the number of employees, the number of past slips issued, and the number of bases.

It is assumed that the information you want to know differs depending on the size of the company. However, by setting the priority of display and association with the work screen considering the size of the user company, it is possible to display the help items according to the priority according to the size of the company. As a result, optimal help items for the user are displayed in the optimal display order.

[Help Screen Display Control Process]

Next, the flow of a help screen display control process S1 executed by the server 10 will be described with reference to the flowchart of FIG. 13. The display control process S1 is executed by the display control unit 26 realized by the processor 11.

The processor 11 of the server 10 receives a user's selection operation from the user terminal 30 through the communication interface 13. When the user's selection operation is received, more specifically, when an operation of pressing F1 or pressing the help icon on the work screen or an operation of pressing (selecting) the help item on the help screen is received as a help operation (S11: Yes), the process proceeds to S12. On the other hand, when the processor 11 does not receive the above-described help operation (S11: No), the processor 11 waits.

In S12, the processor 11 of the server 10 determines the screen displayed on the display device 35 of the user terminal 30 (S12). Specifically, when the server 10 executes the work system 1, a work memory (not illustrated) provided in the storage device 12 is used to have management information for managing which screen (for example, any of work screens including a menu screen, a help pop-up screen, and the like) of the work system 1 is to be displayed on the display device 35 of the user terminal 30. Then, screen identification information of the displayed screen is acquired from the management information. In this example, a screen ID is acquired as the screen identification information.

Then, based on the acquired screen ID, the processor 11 acquires help items corresponding to the screen ID and the priority of the help items with reference to the help item data table T1 (S13).

Then, the processor 11 sorts the acquired help items according to the priority to generate a help screen for displaying the help items in the sorted order (S14).

Then, the processor 11 transmits the generated help screen to the user terminal 30 through the communication interface 13 so that the help screen is displayed on the display device 35 of the user terminal 30 (S15), and ends the process. For example, the help screen H1 is an example of a help screen.

[Statistical and Scoring Process]

Next, the flow of a statistical and scoring process S2 on help items executed by the server 10 will be described with reference to the flowchart of FIG. 14. The statistical and scoring process S2 is executed by the statistical processing unit 28 and the scoring processing unit 29 realized by the processor 11.

In addition, the statistical and scoring process S2 may be executed periodically as a batch process, or may be executed in real time when the reception unit 25 receives a user's selection operation.

When the statistical and scoring process S2 starts, the processor 11 reads the entire user log database T2 or reads the user log database T2 corresponding to a predetermined period (S21). Then, the number of views is counted for each help item in the log data, and the result is output to the log counting database (S22).

Then, the priority of the help items is calculated based on the number of times counted for each help item and the work screen. In addition, the help operation history of the user is learned from the user log, and the learning data is generated (S23). The learning data is generated as a learning model common to all users, a learning model for each user company, and a learning model for each individual user, respectively.

Then, based on a predetermined rule, the work screen to be displayed and the priority are determined for each help item (S24). Then, the help item data table T1 is updated with the determined work screen and priority (S25), and the process ends.

As described above, the help information display system, the help information display method, and the help information display program of the present invention are realized. Therefore, by logging (operation recording), as a help operation history, what kind of trouble the user has on which work screen and performing statistical processing on the recorded help operation history or learning the recorded help operation history, it is possible to improve the display content of the help information displayed on the help screen. Then, it is possible to display the optimal help content for the user based on the learning result obtained by statistical processing or learning for all users, each user company, and/or each individual user. In addition, since the explanatory video of the user terminal operation method or the work execution method can be checked on a terminal other than the user terminal, such as a smartphone, it is possible to operate the user terminal while referring to the explanatory video.

[Other Embodiments]

The present invention is not limited to the embodiment described above. In the present embodiment, an example in which the help information display system of the present invention is applied to the server 10 has been described, but the help information display system of the present invention may be applied to a stand-alone computer.

REFERENCE SIGNS LIST

1: WORK SYSTEM
10: SERVER (HELP INFORMATION DISPLAY SYSTEM)
11: PROCESSOR
12: STORAGE DEVICE
13: COMMUNICATION INTERFACE
21: HELP ITEM STORAGE UNIT
22: USER LOG STORAGE UNIT
23: LOG COUNTING DATA STORAGE UNIT
25: RECEPTION UNIT
26: DISPLAY CONTROL UNIT
27: LOG GENERATION UNIT
28: STATISTICAL PROCESSING UNIT (LEARNING UNIT)
29: SCORING PROCESSING UNIT
30: USER TERMINAL
31: PROCESSOR
32: STORAGE DEVICE
33: COMMUNICATION INTERFACE
34: INPUT DEVICE
35: DISPLAY DEVICE
40: USER ASSISTANT TERMINAL
41: PROCESSOR
42: STORAGE DEVICE
43: COMMUNICATION INTERFACE
44: INPUT DEVICE
45: DISPLAY DEVICE
101: WORK ICON GROUP
102, 202, 302: HELP ICON
111, 116, 121, 126, 131, 136, 137: HELP ITEM DISPLAY AREA
112, 117, 122, 127, 132, 132, 138: QR CODE DISPLAY AREA
113, 118, 123, 128, 133, 138: CLOSE BUTTON
T1: HELP ITEM DATA TABLE
T2: USER LOG DATABASE
W1: MAIN MENU SCREEN
W2: SLIP CREATION SCREEN
W3: SEARCH SCREEN
H1, H2, H3: FIRST HELP SCREEN
H11, H21, H31: SECOND HELP SCREEN
H32: THIRD HELP SCREEN
NW: NETWORK

The invention claimed is:

1. A help information display system that displays help information for supporting an operation of a user on a display device of a user terminal operated by the user, comprising:
a help information memory that stores the help information, information of a work screen associated with the help information, and a priority relevant to a display order of the help information,
a log memory that stores a user log including the operation performed by the user and information relevant to the operation;
a log counting database that stores a counting data obtained by counting the user log stored in the log memory for each user; and
a processor that displays a help screen on the display device including the help information stored and associated with the work screen, based on the work screen displayed on the display device when the processor receives the operation of the user,
wherein
the log memory stores the user log including screen identification information for identifying the work screen on which the user has performed the operation and help information identification information for identifying the help information corresponding to the screen identification information,
the log counting database stores the counting data obtained by counting a number of times each help information has been viewed by the user for each work screen, and
the processor:
determines the priority relevant to the display order of the help information based on the counting data obtained by counting the number of times each of the help information has been viewed and stored in the log counting database, a learning result obtained by learning a help operation history of the user from the user log stored in the log memory, and a number of views of the help information in companies in a group by grouping companies of the same size as a company of the user;
updates the priority stored in the help information memory with the determined priority;
acquires the screen identification information of the work screen displayed on the display device upon receipt of the operation of the user for displaying the help information; and
displays, according to the priority, the help information identified by the help information identification information stored in the help information memory corresponding to the screen identification information.

2. The help information display system according to claim 1,
wherein, as the help information, a QR code for displaying a video explaining the help information associated with the work screen is provided, and
upon receipt of the QR code from a second user terminal, the processor transmits a video file corresponding to the QR code to the second user terminal to make the video file playable.

3. A help information display method by a help information display system that displays help information for supporting an operation of a user, wherein the help information display system includes:
a help information storage unit that stores the help information, information of a work screen associated with the help information, and a priority relevant to a display order of the help information;
a log memory that stores a user log including the operation performed by the user, screen identification information for identifying the work screen on which the user has performed the operation, and help information identification information for identifying the help information corresponding to the screen identification information;
a log counting database that stores a counting data obtained by counting the user log sored in the log memory for each user, the counting data being obtained by counting a number of times each help information has been viewed by the user for each work screen; and
a processor,
the method comprising: by the processor,
determining the priority relevant to the display order of the help information based on the counting data obtained by counting the number of times each of the help information has been viewed and stored in the log counting database, a learning result obtained by learning a help operation history of the user from the user log stored in the log memory, and a number of views of the help information in companies in a group by grouping companies of the same size as a company of the user;

updating the priority stored in the help information memory with the determined priority;

acquiring the screen identification information of the work screen displayed on a display device of a user terminal upon receipt of the operation of the user for displaying the help information; and displaying, according to the priority, the help information identified by the help information identification information stored in the help information memory corresponding to the screen identification information on the display device.

* * * * *